(12) United States Patent
Perkins

(10) Patent No.: US 8,942,233 B2
(45) Date of Patent: Jan. 27, 2015

(54) METHOD AND APPARATUS FOR PERFORMING NETWORK ADDRESS TRANSLATION

(75) Inventor: Charles E. Perkins, Saratoga, CA (US)

(73) Assignee: WiChorus, Inc., Santa Clara, CA (US)

(*) Notice: Subject to any disclaimer, the term of this patent is extended or adjusted under 35 U.S.C. 154(b) by 175 days.

(21) Appl. No.: 13/011,435

(22) Filed: Jan. 21, 2011

(65) Prior Publication Data

US 2011/0182290 A1    Jul. 28, 2011

Related U.S. Application Data

(63) Continuation-in-part of application No. 12/878,005, filed on Sep. 8, 2010, now abandoned.

(60) Provisional application No. 61/276,138, filed on Sep. 8, 2009.

(51) Int. Cl.
*H04L 12/28* (2006.01)
*H04L 29/12* (2006.01)
*H04L 12/26* (2006.01)
*H04J 1/16* (2006.01)

(52) U.S. Cl.
CPC ...... *H04L 61/1511* (2013.01); *H04L 29/12066* (2013.01); *H04L 29/12367* (2013.01); *H04L 29/1249* (2013.01); *H04L 43/028* (2013.01); *H04L 61/2514* (2013.01); *H04L 61/256* (2013.01)
USPC ............ 370/389; 370/252; 370/238; 709/238

(58) Field of Classification Search
USPC ........... 370/252, 237, 238, 389; 709/238–242
See application file for complete search history.

(56) References Cited

U.S. PATENT DOCUMENTS

| 7,602,785 | B2* | 10/2009 | Dharmapurikar et al. ..... 370/392 |
| 8,130,768 | B1* | 3/2012 | Ahrens et al. ................. 370/401 |
| 8,190,763 | B2 | 5/2012 | Savoor et al. |
| 8,239,751 | B1 | 8/2012 | Rochelle et al. |
| 8,339,959 | B1 | 12/2012 | Moisand et al. |
| 8,363,650 | B2 | 1/2013 | Rao et al. |
| 8,572,717 | B2* | 10/2013 | Narayanaswamy ............ 726/12 |
| 8,601,567 | B2 | 12/2013 | Spatscheck et al. |
| 2003/0092442 | A1 | 5/2003 | Dalal et al. |
| 2003/0236913 | A1 | 12/2003 | Hoban et al. |
| 2004/0076180 | A1 | 4/2004 | Satapati et al. |

(Continued)

*Primary Examiner* — John Pezzlo
(74) *Attorney, Agent, or Firm* — Hamilton, Brook, Smith & Reynolds, P.C.

(57) ABSTRACT

An embodiment of the invention is a method and corresponding system for improved network address translation (NAT) operation, to enable efficient translation for packets destined for communication systems within a domain utilizing network addresses that are incompatible with source and destination addresses indicated in packets delivered from the global Internet. Since the addresses are not compatible with global Internet addresses, delivery cannot be accomplished except by some method of address translation. Traditional systems have not been constructed to enable such inbound translations, providing, instead, only communication outbound from the incompatibly addressed domain towards the global Internet. The example embodiment employs history and pattern matching between observable characteristics of the inbound payload, associated over time with specific destinations. The example embodiment may also employ DPI search techniques known from widely deployed systems in use today, to identify a field on which the pattern matching may operate.

35 Claims, 6 Drawing Sheets

(56) References Cited

U.S. PATENT DOCUMENTS

| | | |
|---|---|---|
| 2005/0152298 A1 | 7/2005 | Thubert et al. |
| 2006/0259625 A1 | 11/2006 | Landfeldt et al. |
| 2006/0274749 A1 | 12/2006 | Beier |
| 2008/0307081 A1 | 12/2008 | Dobbins et al. |
| 2009/0100169 A1 | 4/2009 | Allen et al. |
| 2011/0004932 A1 | 1/2011 | Spatscheck et al. |
| 2011/0182183 A1 | 7/2011 | Perkins |
| 2011/0185085 A1 | 7/2011 | Perkins |
| 2011/0202679 A1 | 8/2011 | Cohen et al. |
| 2012/0033664 A1 | 2/2012 | Pignataro et al. |
| 2012/0240185 A1* | 9/2012 | Kapoor et al. .................. 726/1 |
| 2012/0243547 A1 | 9/2012 | Pardo-Blazquez et al. |
| 2014/0053239 A1 | 2/2014 | Narayanaswamy |

* cited by examiner

US 8,942,233 B2

METHOD AND APPARATUS FOR PERFORMING NETWORK ADDRESS TRANSLATION

RELATED APPLICATIONS

This application is a continuation-in-part of U.S. application Ser. No. 12/878,005, filed Sep. 8, 2010 now abandoned, which claims the benefit of U.S. Provisional Application No. 61/276,138, filed on Sep. 8, 2009. The entire teachings of both of the above-referenced applications are incorporated herein by reference. The teachings of all patents, published applications, and references cited herein are incorporated by reference in their entirety.

BACKGROUND OF THE INVENTION

As the Internet has evolved, the number of network-layer protocol addresses ($2^{32}$) has proved to be insufficient for maintaining full connectivity between the continually growing number of network devices attached to the Internet. For this reason, a new network-layer protocol, known as Internet Protocol version 6 (IPv6), has been designed to replace the currently deployed network-layer protocol, known as Internet Protocol version 4 (IPv4). The numbers 6 and 4 refer to the version numbers of the two protocols, respectively. This new address space, IPv6, supports $2^{128}$ (which is approximately $3.4 \times 10^{38}$) addresses; thereby making astronomically more unique network-layer addresses available for Internet devices. See, e.g., Internet Engineering Task Force (IETF) Request for Comments (RFC) 2373 and RFC 2460.

SUMMARY OF THE INVENTION

An example embodiment of the invention is a method, or corresponding apparatus, for performing network address translation. The embodiment maintains records about certain fields of traffic packets with incoming payloads associated with a flow in which flow translation in a network address translation device has been initialized, stores history of destination access patterns to destinations, optionally across multiple users, and uses at least a subset of the records and history to disambiguate traffic packets with a resource identifier determined to be associated with the records.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1A:
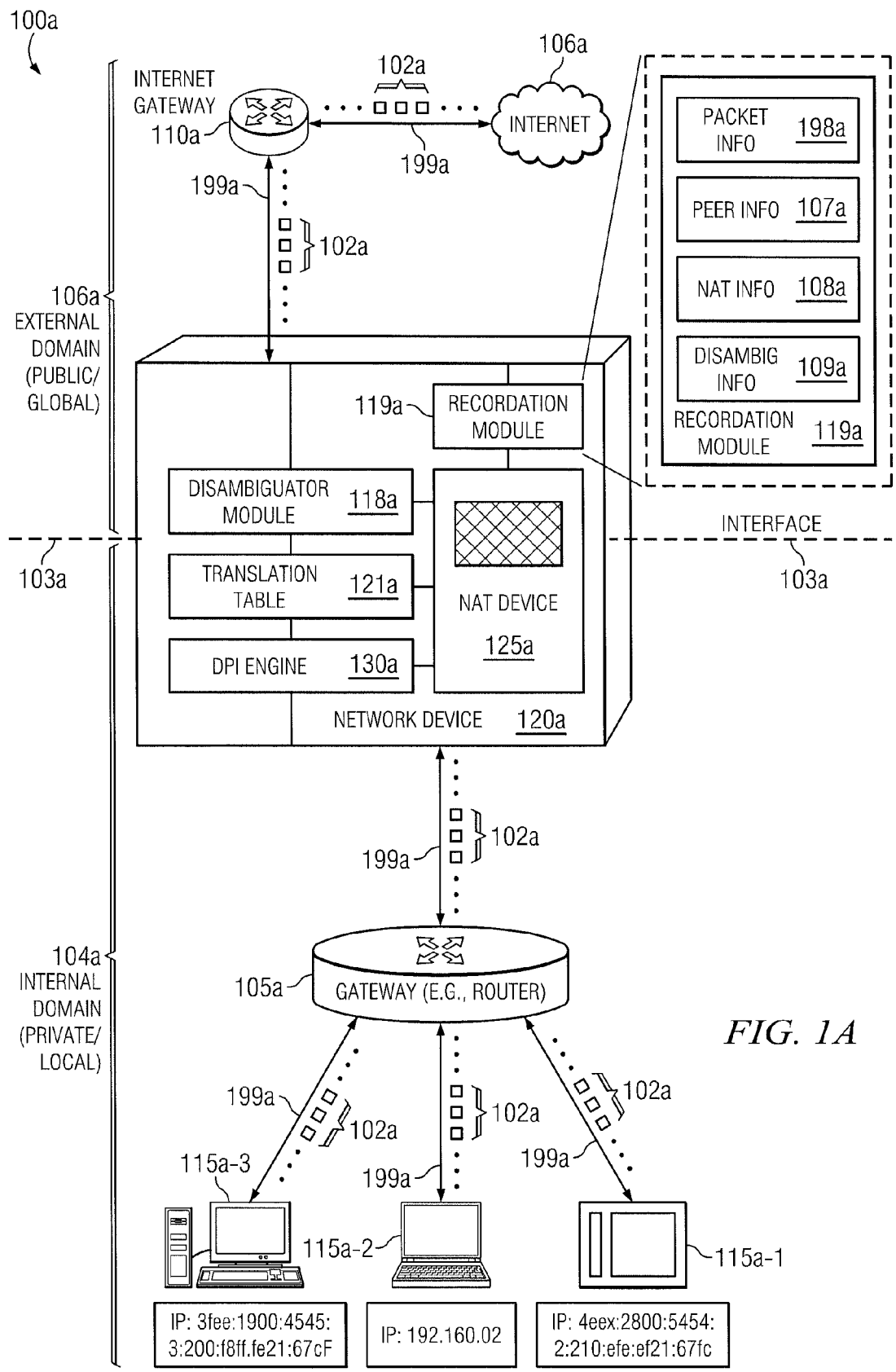
FIG. 1A is a network diagram of an example embodiment of the invention that illustrates operably interconnected network elements.

A description of example embodiments of the invention follows.

Example embodiments of the present invention include methods, apparatuses, and computer program products for network address translation employing deep packet inspection at a boundary between an external domain network with global addresses (e.g., the Internet) and an internal domain network with local address (e.g., a customer network). Although motivated by an impending need to support more addresses than Internet Protocol version 4 (IPv4) can handle given the growth in popularity of network devices, which gave rise to Internet Protocol version 6 (IPv6), as described immediately below, embodiments of the present invention more generally apply to any networks, now existing or hereinafter developed, having local and global addresses or an internal domain and external domain. Before describing embodiments of the present invention, a description of history and current developments of networking is presented.

An alternative method to the new network-layer protocol (i.e., IPv6) has been deployed, which is known as "network address translation," or NAT, and is often considered a temporary measure. Today, the access routers found in most households and business offices use NAT to enlarge the number of IPv4 addresses available to the computers attached to the household or business network, which may be referred to as "customer premises networks" or CPNs. NAT works by changing the IPv4 address given by the Internet Service Provider (ISP) into some other IPv4 address that belongs to a device connected to a CPN. This translated address is at the same time accessible by an access router (i.e., customer premises equipment, or CPE) connecting the ISP to the CPN. See RFC 2663. In most cases, the translated address, which identifies the device on the CPN, is also a private address. See RFC 1918.

Since the introduction of IPv6, various strategies have been proposed to help with the transition from IPv4 to IPv6. In the meantime, the widespread deployment of network address translators (NATs or NAT devices) for most customers has extended the lifetime of IPv4 so that there has not been as much immediate pressure for the adoption of IPv6. This is because the RFC 1918 private addresses consumed on the CPN are not required to be unique, and, thus, the same address space can be re-used many times.

Nevertheless, the IPv4 address allocation continues steadily, and the entire IPv4 address space will be depleted in the year 2011, or soon thereafter, at the latest. As a result, there is a very significant economic incentive towards making the long-delayed transition to IPv6, even though for most existing customers using RFC 1918 private addresses the effects are not noticeable. Much of the negative effect of IPv4 address depletion will be shouldered by new businesses, which may no longer be able to acquire an appropriate IPv4 address from their service providers. The details of managing CPE with NAT and private address space are the subject of a lively debate within the IETF and the Internet at large. See RFC 3424 for details.

When a device attached to a CPN has a private address, its IPv4 address can typically no longer be made available to the global Internet by way of a Domain Name System (DNS). The device can initiate outbound communications to a partner accessible at a globally unique Internet address, because that does not require the device's IPv4 address to be registered in the global DNS. Once the device's communications partner receives the initial packets sent by the device, a bidirectional communications stream can be maintained.

When the CPE (e.g., the access router with NAT functionality) translates the device's private address into the CPE's public address (as assigned by the ISP), it also typically allocates a new port number for the device. The CPE changes the device's outgoing data packets by translating the source IPv4 address and source port to be the CPE's IPv4 address (i.e., the IPv4 address of the NAT device) and the newly allocated source port. The new port is used to identify which CPN device should receive inbound packets from the newly initiated communication stream. Thus, the CPE creates an association between the device's private IPv4 address and a port number that is expected to be found in all inbound packets destined for that device. This association is maintained in a set of translation registers or tables that may be consulted for all inbound traffic from the global Internet.

Most such CPEs do not enable contact to the privately addressed devices to be initiated by other computers not on the CPN. Thus, NAT restricts the devices to run only "outbound" applications like web browsing, sending e-mail, and making outbound telephone calls. Such privately addressed devices cannot easily host servers or websites for the outside global Internet, and without further arrangements, these devices cannot receive telephone calls. Receiving e-mail has to be accomplished by initiating contact with an external mail server, which must passively store e-mail files until the privately addressed device initiates another e-mail client session. Thus, "push" services are more difficult for devices situated behind NAT devices.

Similar techniques used by CPEs to provide private addresses to devices on a CPN can also be used to connect IPv6 to the global IPv4 Internet, by way of the IPv4 address provided by the ISP. Using IPv6, there is no need for the CPN addresses to be re-used for multiple CPNs; put another way, IPv6 easily enables the availability of globally unique network-layer addresses. These globally unique addresses cannot typically be used to establish network communications with existing Internet websites that only understand version 4 of the Internet Protocol (i.e., the protocol that makes use of the IPv4 network-layer addresses). However, since the CPE translates the IPv6 device address into the IPv4 address assigned to the CPE router, the CPE enables the use of IPv6 for customer premises devices to work with the existing IPv4 Internet, just as it enables devices with private IPv4 addresses to use the global Internet.

Usually, before communications are initiated between two computers, such as devices with internetwork access capabilities on a global data communications system (e.g., the Internet), the initiating partner has to consult a DNS server to find the network-layer address of the desired destination partner. For this case, referred to as source Internet protocol NAT (SIPNAT), the destination computer must have its network-layer address registered with DNS server, even though there is no such requirement for the initiating computer. The initiating computer sends a DNS server query, which is often handled by several DNS servers cooperating to give access to all the Internet Protocol (IP) addresses that have been registered anywhere in the DNS server serving the global Internet. The query eventually arrives at the DNS server maintained for use by the CPE, which, for purposes of illustrating example embodiments of the present invention, will provide the IP address for some device on the CPN. This IP address is forwarded back to the initiating computer by way of a DNS server reply packet; IPv4 address information is contained within a "record" supplied as part of the DNS server reply. See RFC 1035.

Previous techniques (e.g., SIPNAT, IVI, etc.) have been proposed for facilitating the translation of packets from the Internet into the IPv6 or privately addressed domain. IVI has the defect of generally requiring static allocation of a global network interface for each internal destination. A DNS-based procedure is used by the SIPNAT proposal, but there are situations in which variations in the deployed behavior of the DNS server can introduce ambiguities into the results obtained by use of SIPNAT.

It has been observed that many network-based applications exchange data, which can in some way be used to characterize or identify the recipient. For instance, applications often negotiate a unique resource identifier, which the application can use as an index into a local resource database; this is particularly true for multi-threaded server applications. Of course, the association between the resource identifier and the destination may be far less transparent than the association between the destination and the IP address assigned to the destination.

Before describing in detail example embodiments that are in accordance with the present invention, it should be observed that example embodiments of the present invention reside primarily in combinations of methods or apparatus components related to method and system for communicating a plurality of packets between the customer premises and computers available by way of the global Internet. Accordingly, the methods or apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. In addition, although the terms "traffic packet" and "deep packet inspection" are being used, the terms are for convenience and other forms of communications signaling and inspection thereof, such as traffic frames, data signals, and the like, are contemplated to be within the scope of the present invention.

Example embodiments of the invention improve the operation of network address translators (NATs), network address translation devices (NAT devices), or network address translation boxes (NAT boxes), which are commonly employed for managing the forwarding interface between two computer networks that have incompatible addressing methodologies for the network layer addressability of the devices in the two networks. It should be understood that "NATs," "NAT devices," and "NAT boxes" are used interchangeably herein and may be in the form of hardware, firmware, software, or known or hereinafter developed combinations thereof.

One example embodiment of the present invention uses techniques from SIPNAT to set up an association between external and internal domain address or port-based flow translation, and then uses application-specific methods to discover a resource identifier. External domain, as used herein, can be associated with a global Internet address, client-side address, or public address; an internal domain can be associated with a local network address or private address. Once the discovered resource identifier has been recorded, it can be used to disambiguate any remaining decisions that may be caused by DNS server anomalies or strategies for averting Denial of Service attacks.

Example embodiments described herein enable computers, such as client-side devices, on the global Internet to initiate contact to devices connected to the CPN behind a NAT device function, with either IPv4 or IPv6 network-layer addresses. In one such example embodiment, when a packet arrives at the CPE, the access router employs its knowledge of a source port or flow translation that has been associated with the device connected to the CPN. In other words, various embodiments of the invention provide methods and systems for enabling computers on the global Internet to initiate contact to devices connected to the CPN behind a NAT device, with either IPv4 or IPv6 network-layer addresses.

Alternative example embodiments of the present invention can use SIPNAT and employ DPI to establish address/port flow translation from a source to a destination behind a NAT device.

Additional example embodiments of the present invention can allow for external domains with an IPv4 network addresses to initiate and maintain communications with internal domains with IPv6 network addresses without the NAT device having knowledge of the destination port number or having the communication already initiated. In one such example embodiment, the source IP address of a traffic packet can be used, for example, to select or determine the IPv6 destination address. Further example embodiments of the present invention may use the source port number to determine the IPv6 destination in order to exercise finer control in determining or selecting the destination.

In further alternative example embodiments of the present invention, bidirectional NAT can be employed for communications between an external domain and an internal domain (e.g., communications between an IPv4 network address and an IPv6 network address) using a DNS server. In one such example embodiment, the bidirectional communication does not require changes to either an IPv6-only host or router or an IPv4-only host or router. Additional advantages of one such example embodiment include an ability to delegate special or specified domains to the NAT device, no requirement or need to establish point-to-point tunnels (tunneling) or use of tunneling protocols in order to carry IPv6 packets over an IPv4 routing infrastructure, and no requirement for Dual IP layer (dual-stack) implementations or protocols in order to provide support for both IPv4 and IPv6 in hosts and routers. Some such example embodiments can model the communications in a manner similar to flow management, including multiple parameters, such a 5-tuple parameter including for an incoming flow, for example, the IPv4 destination address, the source port number, the NAT device address, the destination port number, and a type of service (TOS) parameter, which can be mapped or managed to an outgoing flow including 5-tuple parameters, such as an IPv4 map, a source port number, an IPv6 dev, a destination port number, and a TOS parameter.

Such example embodiments can run at line speeds by employing flow management, and such modeling can further provide for scalability and understanding of flow records. Alternative example embodiments of the present invention allow for a scalable approach by allowing each IPv4 addressed used by the incoming flows to be shared by multiple different IPv6-only devices. The degree of scalability of such an approach can vary on multiple factors; for example, scalability may be determined by the rate of arrival for new incoming connection requests or by the number of connection requests initiated from a particular IPv4 host.

FIG. 1A is a high-level network diagram of an example embodiment of the invention that illustrates a communications internetwork 100a. The internetwork 100a can be any network or combination of networks, such as a global Internet 106a operably interconnected to a local network 104a, and can include a plurality of network elements, such as end user devices 115a(1-3), gateway 105, network device 120a, Internet gateway 110a, or other network elements currently known or future developed. In alternative example embodiments, the network device 120a can connect directly to the Internet 106a or other public networks (not shown) without the use of an intermediary network element, such as the Internet gateway 110a.

Example embodiments of the present invention can include network translation that works by translating a global Internet address (external domain address) to a local network address (internal domain address), and vice versa. Translation may also be used to translate one legacy communications protocol address, such as IPv4, into a different or updated communications protocol address, such as IPv6.

Example embodiments of the present invention provide for bidirectional communications using NAT while providing operational conveniences that will encourage the adoption of IPv6 by enabling IPv6-only devices to provide services to and communication with existing IPv4 devices. The specialized approaches provided by example embodiments of the present invention allow for forms of flow management where traffic flow through a NAT device is identified using source and destination IP address (and additional information if wanted) to allocate and deallocate resources for communication between IPv4 and IPv6 nodes.

Continuing to refer to the example embodiment of FIG. 1A, traffic 102a, originating at a source, such as an external domain 106a (also referred to herein as a global Internet, public domain, or client-side domain), may travel toward a destination, such as an internal domain 104a (also referred to herein as a local domain or private domain) via a medium, such as links 199a. The links 199a can be some combination of wired links, optical links, wireless links, and the like. The entities communicate by exchanging traffic packets according to a pre-defined set of network protocols, such as the Transmission Control Protocol/Internet Protocol (TCP/IP), or other currently known or future developed communications protocols. The traffic 102a can be forwarded to a corresponding gateway 105a via the medium 199a. The gateway 105a can be any of a multitude of wireless or wired gateways, such as an Application Layer Gateway (ALG), Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway. In alternative example embodiments of the present invention, the gateway 105a can be any network node, such as a router, that can provider interoperability between networks using the same or different communications protocols. The gateway 105a can maintain, or be operably interconnected to, a network address translation (NAT) device 125a.

An example embodiment of the present invention further can include the NAT device 125a to perform network translation on the network address information included within a header of the traffic packet 102a by translating an internal (e.g., private) network address 140 to an external (e.g., global)

network address 160a, and vice versa, relative to the NAT device 125a. The NAT device 125a can maintain records of translations in a translation table 121a, which can be accessible to a Deep Packet Inspection (DPI) engine 130a or other network elements as may be needed. Alternatively, the network device 120a in which the NAT device 125a can maintain the translation table that is shown in the embodiment of FIG. 1A, 121a. After the network address translation is complete, the traffic packet 102a is forwarded to its destination, such as any of the end user devices 115a-1 . . . 3.

Alternative example embodiments of the present invention can include the NAT device 125a, which can share a single external Internet Protocol (IP) network address, or a limited number of external IP network addresses, between a network of machines or elements. Specifically, example embodiments of the NAT device 125a can alter the IP header (not shown) of the traffic packet 102a as it flows from a source to a destination through the NAT device 125a, in which case the NAT device 125a can optionally change the source address of the IP traffic packet, destination address of the IP traffic packet, or both addresses as the NAT device 125a or network device 120a sends the traffic packet 102a on its way from source to destination. The NAT device 125a can maintain records of the flow of packets across the network device 120a.

In an example embodiment of the present invention, the network device 120a can contain or be interconnected operably to a disambiguator module 118 that can ascertain characteristics of inbound traffic packets to determine a particular destination associated with the inbound traffic packets based on pattern matching. The disambiguator module 118 can further include or be interconnected operably to a recordation module 119 (described below) and/or to a memory device 117 currently known in the art or future discovered. The disambiguator module 118 can isolate or tabulate statistics for certain fields of an application protocol messages (not shown and described in more detail below in reference to FIG. 5). The determined statistics can further be used to disambiguate traffic packets including use of a resource identifier that is more or most likely to be determined to be associated with records stored in the recordation module 119, the memory 117, or other such location where records may be located. The recordation module 119 can record additional information, for example, information relating to or of the public address of the NAT device 125a, the private address of the NAT device 125a, the IPv4, IPv6, or other communication protocol addresses associated with the traffic packets, resource information or identifiers associated with a source or destination, or other such information relating to network address translation that is currently known in the art or hereinafter developed.

In an example embodiment of the present invention, the network device 120a can contain or be interconnected operably to a recordation module 119a for storing history of characteristics of traffic packets 199a in the network. The recordation 119a can record information and history relating to traffic packets on the internal domain 104a, the external domain 106a, and optionally can record information relating to other network devices or additional networks interconnected operably to the communication internetwork 100a. The recordation module 119a can, for example, include traffic packet information 198, peer information 107, network address translation information 108, which can include information regarding the processes of the NAT device 125a or information relating to the hardware or software components of the NAT device 125a. The recordation module 119 can further include information regarding the disambiguator module 118, for example, such as characteristics of inbound or outbound traffic packets, header or payload information of traffic packets, application fields associated with the traffic packets, access patterns associated with the source or destination of the traffic packets, or other contextual information, such as time or day or geographic location of the source or destination of the traffic packet. Contextual information can include additional data or records that associated with the internetwork 100a, other interconnected networks, or other information currently known or future developed that may pertain to network address translation.

In an embodiment of the invention, as time goes on, at least for the most popular resource servers, statistics are kept that indicate reliability of using the resource identifier (e.g., a pathname) (along with other information from the application packets exchanged) as a means for identifying the destination. In other words, each such resource identifier is recorded along with an indication about the degree of certainty of the actual destination. In most cases, the destination will, in fact, be known for certain. If it is discovered that the same resource identifier is reliably associated with two different destinations, then the identifier cannot be used as the sole determinant for delivering payloads to the destination, and an additional example embodiment of the present invention, such as one in which DPI can be employed to determine the destination can be employed. Nevertheless, the restricted set of destinations that are shown to host resources with the same resource identifiers can still be profitably used to disambiguate future deliveries.

Figure 1B:
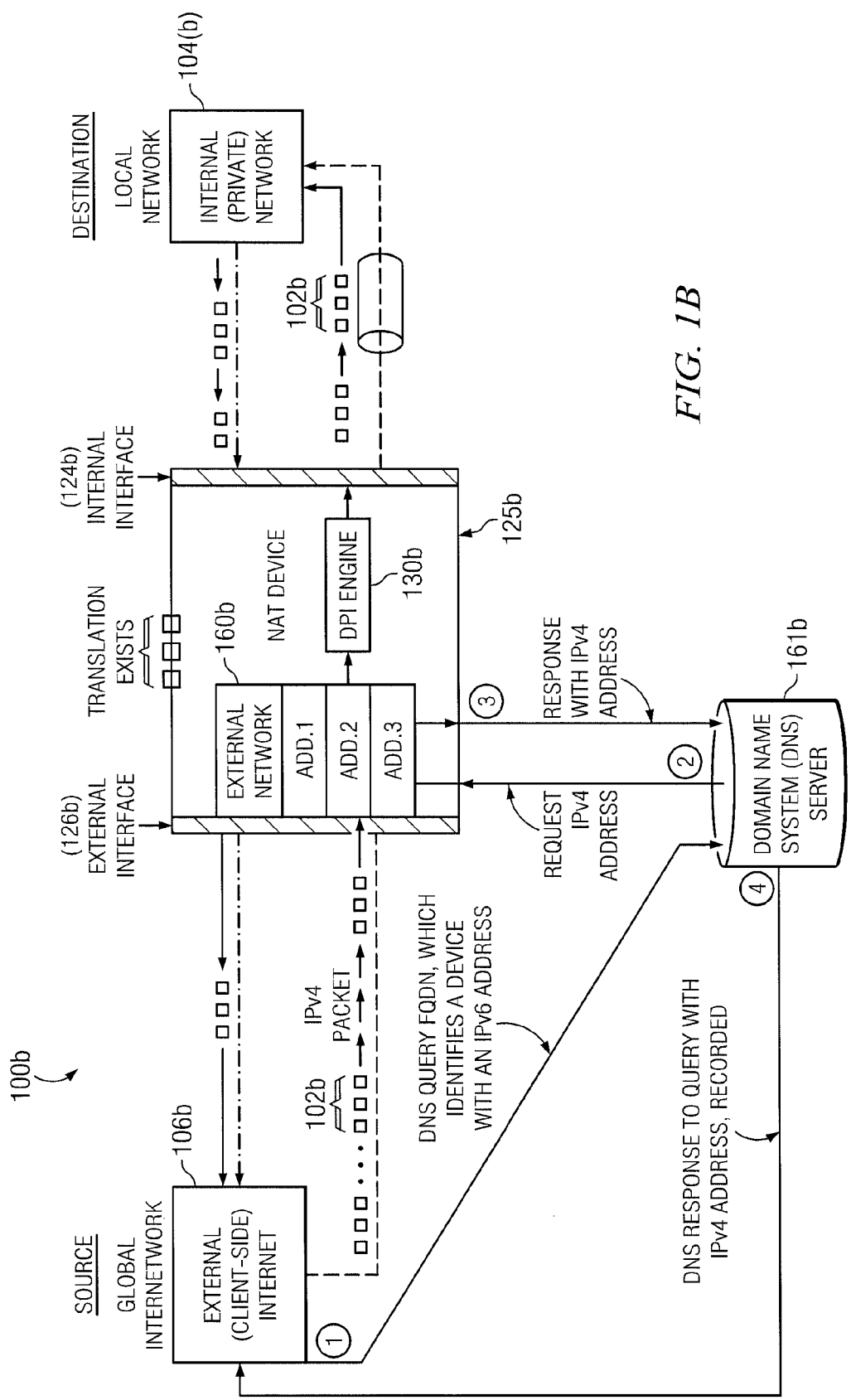
FIG. 1B is a network diagram of an example embodiment of the invention that illustrates operably interconnected network components to perform network address translation between a source and a destination.

FIG. 1B is a network diagram of an example embodiment of the invention that illustrates a communications internetwork 100b employing bi-directional source Internet Protocol network address translation (SIPNAT). The example network 100b illustrates a source, such as global internetwork 106b connected to a destination, such as local network 104b. The global internetwork 106b can be known as an external network, client-side network, or public network, any of which are used herein interchangeably. Additionally, the local network 104b can be known as an internal network or private network, also used herein interchangeably. The source 106b can be operably interconnected to the destination 104b via any communications interface or medium (e.g., an optical fiber, copper wire, or air interface), which is operably interconnected to a network address translation (NAT) device, which, for example, can be located at a network router or node.

Example embodiments of the present invention can employ SIPNAT to establish address/port flow translation by employing deep packet inspection of traffic packets in the flow, as described below. The example network 100b of FIG. 1B can enable a server to initiate contact with a client, and vice versa, without parameters for each flow having to be established by the internal network node. Using SIPNAT, an external domain 106b can query a domain name system (DNS) server 161b to establish or complete the required parameters (i.e., a source address for a traffic packet arriving at the NAT device, a destination address for a traffic packet arriving at the NAT device, a source address of the traffic being transmitted from the NAT device, and a destination address of the traffic being transmitted from the NAT device) for the flow translation, which is explained in detail below in reference to FIG. 3B. The external domain 106 can send a DNS query for a fully qualified domain name (FQDN), where the FQDN can identify a device with an IPv6 address.

Continuing to refer to FIG. 1B, when the DNS 161b allocates an external (source) domain NAT address 160b on a NAT device 125b, the traffic flow is in a pending state because only three of the four addresses are known (i.e., the destination (internal) IP address for the packet, destination (internal) NAT IP address for the packet on the internal domain, and source (external) NAT IP address for the packet on the external domain). When the packet arrives at an external NAT interface 126b, if that packet does not match any existing, previously established, or pending flow being maintained at the external NAT interface 126b, then that packet is considered to establish the pending flow. The source (external) IP address of the incoming packet is used to finish the required quadruplet of addresses. In alternative example embodiments of the present invention, the NAT device 125b can be operably interconnected to a translation table (not shown), which can maintain IP addresses in order to map addresses to a single IP address and readdress the outgoing IP packet so the source IP address of the internal packet appears as the source IP address of the NAT device.

In order to complete a traffic flow, the NAT device, or other operably interconnected physical or logical element, determines the source address of all traffic flows pending at the external interface of the NAT device. If the determined source address has a pending flow, then the NAT IP address is established as the source address of the traffic packet, thereby completing the quadruplet information of the flow, which causes the flow to no longer be in a pending state. A completed flow may be forwarded to the destination of the traffic packet with the readdressed source IP address being the source NAT IP address.

In alternative example embodiments of the present invention, the DNS-based setup can provide IPv4 addresses for communication with an IPv6 device and use a source IP address to select of allocate the IPv6 destination. The example embodiment can further use the source port number to maintain and exercise finer control of traffic communications between the IPv4 and IPv6 addresses. The example embodiment further provides for bidirectional network address translation between external and internal domains using different or incompatible communications protocols. In the example embodiment employing bidirectional NAT using the DNS and SIPNAT, translation is simplified and does not have dual-stack requirements or tunneling or encapsulating of the IPv6 packets in IPv4 packets.

In alternative example embodiments of the present invention, after the initial contact to the DNS server, by which the flow translation has been initialized, additional operations can be employed to ensure delivery of the traffic packet 102b to the proper destination. In particular, in one embodiment, when a payload containing the resource identifier arrives for disposition by the NAT device, the NAT device 125b can use deep packet inspection (DPI) in order to determine the destination for the traffic packet. A DPI engine 130b can parse the payload of the traffic packet in order to inspect stored data about a resource identifier that can be used to disambiguate problematic deliveries.

In further alternative example embodiments of the present invention, when a flow being maintained at the external interface 126b of the NAT device 125b is in a pending state, the pending address would be the address of the NAT device, which would cause the DNS server 161b not to provide the external domain address. When an address is in pending state on the NAT device 125b, that address cannot be used by the DNS server 161b for another flow until the pending flow is established and that address is no longer in the pending state. For a similar rationale, the NAT device translation table cannot maintain two traffic flows with the same source address because each source address is used by the NAT device to determine to which destination to forward the traffic packet. As such, in further alternative example embodiments of the present invention, the directionality of the traffic flow is useful because, when an application wants to transmit traffic to a destination in the network, the application looks to the DNS server for information.

Figure 2:
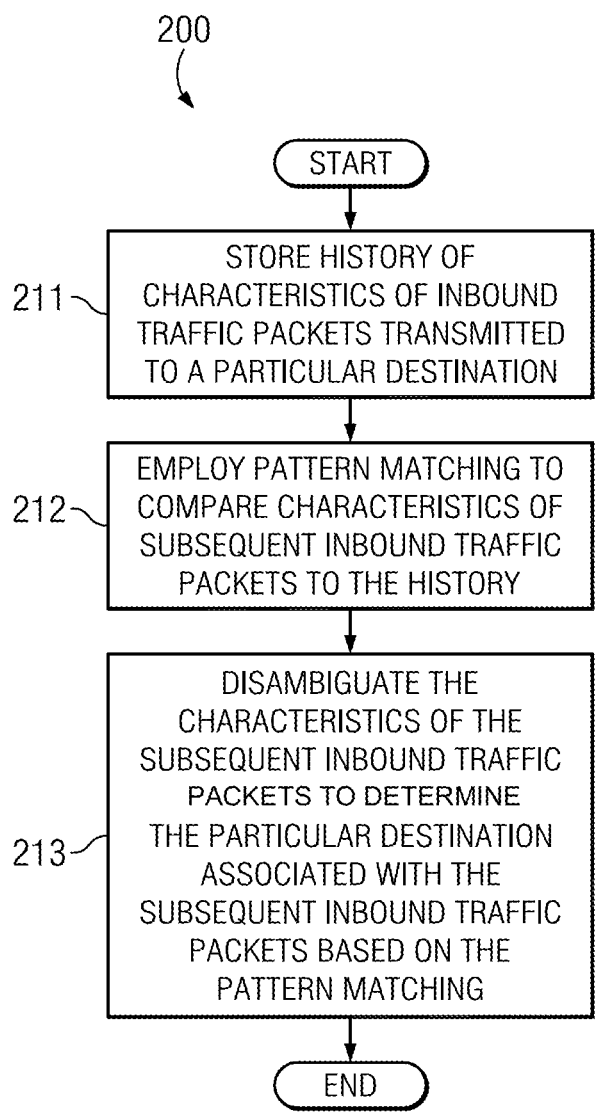
FIG. 2 is a flow chart of an embodiment of the present invention that illustrates functions involved in performing network address translation.

FIG. 2 is a flow chart 200 illustrating a method by which a network address translation (NAT) device, such as the NAT device 125a of FIG. 1A, can perform network address translation according to an example embodiment of the present invention. According to the example embodiment, the flow chart 200 performs stores a history or multiple histories of characteristics of inbound traffic packets transmitted to a particular destination (211). In some example embodiments of the present invention, characteristics of traffic packets can include information or data relating to, for example, packet headers, footers, payload, applications, physical locations of sources and destinations, time of day, and other information pertaining to traffic packets in a communication network as may be applied to network address translation. The flow chart 200 further employs pattern matching to compare characteristics of subsequent inbound traffic packets to the history (212). The flow chart 200 further disambiguates the characteristics of the subsequent inbound traffic packets to determine the particular destination associated with the subsequent inbound traffic packets based on the pattern matching (213).

Figure 3:
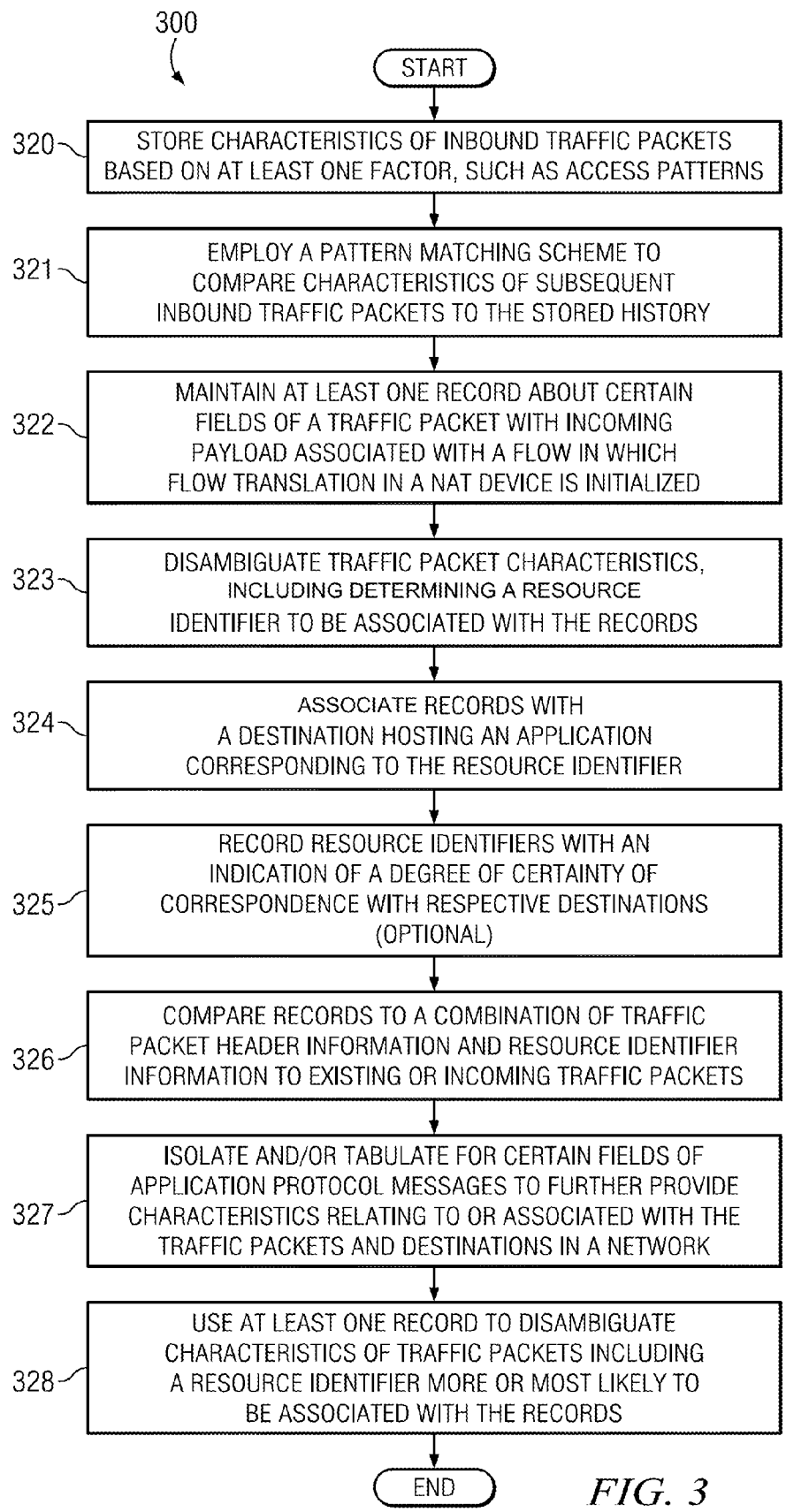
FIG. 3 is a flow diagram of an embodiment of the present invention that illustrates a method of pattern matching for use with network address translation.

FIG. 3 is a flow diagram 300 of an embodiment of the present invention that illustrates a method of network address translation employing pattern matching. Example embodiments can be performed in a network device, such as the network device 120b in FIG. 1B, or performed in other network elements or sub-elements operably interconnected in a communication network, such as network 100b.

In an example embodiment of the procedure of FIG. 3, after beginning, the flow chart 300 can store characteristics of inbound traffic packets based on many factors, including, for example, based on access patterns to destinations (320). Once information relating to at least one traffic packet has been stored, the flow chart 300 can employ a pattern matching scheme, such as an algorithm, to compare characteristics of subsequent inbound traffic packets to the stored history (321). The flow chart 300 can then maintain records about certain fields of a traffic packet with incoming payload associated with a flow in which flow translation in a NAT device is initialized (322). Using at least a subset of the records, characteristics of traffic packets can be disambiguated, including determining a resource identifier to be associated with the records (323). In some example embodiments, such records including resource identifiers, can be associated with a destination hosting an application corresponding to the resource identifier (324). The flow chart 300 can optionally record the resource identifiers along with an indication of a degree of certainty of correspondence with respective destinations (325).

Continuing to refer to the example embodiment of FIG. 3, the maintained records can be used for comparing a combination of traffic packet header information and resource identifier information to existing or incoming traffic packets (326). Based on such comparisons, statistics and information maintained can be isolated and tabulated for certain fields of application protocol messages to further provide characteristics relating to or associated with the traffic packets and destinations in a network (327). At least one record can be used to disambiguate characteristics of traffic packets including a resource identifier more or most likely to be associated with the records (328).

Alternative, example embodiments of the present invention can include employing a method, such as the method of flow diagram 300, to ensure delivery of a traffic packet to a proper destination based on historical records of traffic packets in a flow in which network address translation has been initialized. For example, in such a method, the NAT device can maintain details, information, and/or records relating to certain fields within incoming payload. For traffic packets that are unambiguously targeted to a specific destination, an example embodiment of FIG. 3 can algorithmically delimit fields of the payload of the packet. The packet payload fields can be inspected and characterized for future pattern matching operations. In such an example embodiment, when, if at all, a similar or matching traffic packet payload arrives for disposition by the NAT device, the data recorded previously relating to matching payloads can be used to disambiguate deliveries of traffic packets. In such an example embodiment, the payload itself can be used to identify the destination node to which the flow is intended.

Further alternative example embodiments can collect resource identifiers by parsing traffic flow management algorithms or state machines. Additionally, example embodiments of the flow chart 300 can monitor the progress of a negotiation between at least two peers on the same network or different networks to determine the establishment of a corresponding resource identifier transmission between the peers. Additional information may be maintained, for instance, an alternative example embodiment of the flow chart 300 may employ deep packet inspection (DPI) to obtain data from the certain fields of traffic packets and can further be used to inspect the payload of the traffic packets. Information determined by DPI (detailed below in FIG. 5), or other inspection, can be uniquely associated with one specific destination for the payload.

Alternative example embodiments can employ the history and pattern matching techniques (described above) between observable and recordable characteristics of inbound payload associated with traffic flow over time based on the destinations of the flow. In this and possibly other example embodiments of the present invention, the target destination of the incoming traffic packets can be inferred or calculated by the flow chart 300 based on inspection of the traffic packet payload. Such alternative example embodiments can improve reliability and certainty of the destination based on alternative and/or additional information other than the packet header fields alone. For example, while a network-layer (see below description of FIG. 5) protocol header of an incoming packet can ensure packet arrival at a proper global NAT address that has an existing flow translation enabled; however, employing example embodiments of the present invention can identify the correct destination even in light of some ambiguity in information due to, for example overlapping traffic flows at the same global NAT network interface address. In an example embodiment of the present invention, if a packet arrives at an address, but the flow parameters have time out, the example embodiment can still effectuate routing and delivery where the payload includes information that can be uniquely associated with one specific destination for that payload.

Figure 4:
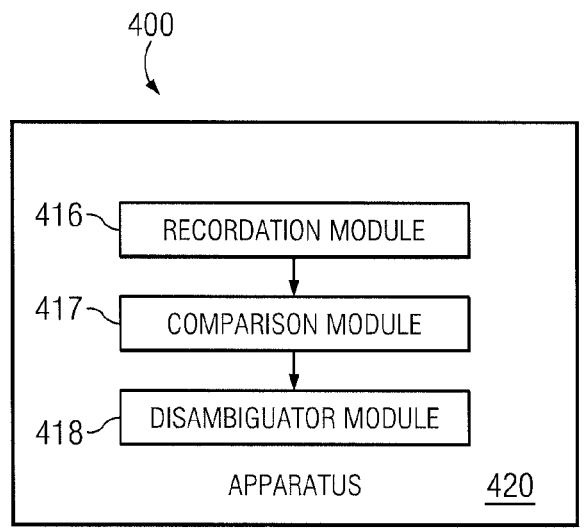
FIG. 4 is a block diagram of an embodiment of the present invention that illustrates components involved in performing network address translation employing pattern matching.

FIG. 4 is a block diagram 400 of a network apparatus 420, such as the network device 120a of FIG. 1A, according to an example embodiment of the present invention. Components of the network apparatus 420 can include a recordation module 416, a comparison module 417, and a disambiguator module 418. According to an example embodiment, the recordation module 416 can store history characteristics of inbound traffic packets associated with a particular network destination. Further, the recordation module 416 can be employed to monitor traffic flow from an internal network, such as internal domain 104a of FIG. 1A or external domain 106a; such monitoring can include recording information relating to or of the traffic packet, peer user information, source and destination information, address information, and other such information that may be applicable for use in network address translation as is currently known or hereinafter determined. The recordation module 416 can transmit information to the comparison module 417; for example, the recordation module 416 can forward all or some information in the maintained records including access patterns of traffic packets in flows from the same source to different destinations, the same source to the same destinations, or other permutations thereof. The comparison module 417 can employ a pattern matching technique to compare characteristics of subsequent inbound traffic packets to the history provided by the recordation module 416. The comparison module 417 can further transmit or notify the disambiguator module 418 of the available records and other information pertaining to the traffic packet, traffic flow, or other network components. The disambiguator module 418 can identify and determine the characteristics of the subsequent inbound traffic packets to determine the particular destination associated with the subsequent inbound traffic packets based on the pattern matching. Alternative example embodiments of the present invention can further disambiguate characteristics and information pertaining to or contained in traffic packet headers or payload from inbound and outbound traffic packets in a flow with network address translation already established.

In alternative example embodiments, the modules 416, 417, 418 can be operably interconnected via a logical or physical connection to a memory device that maintains all or parts of the recorded histories. Further alternative example embodiments of the modules 421 and 422 of block diagram 400 can be located at a network element or sub-element interconnected operably in a communication network. Further alternative example embodiments of the present invention can include modules being in a system of any physical or logical configuration.

Figure 5:
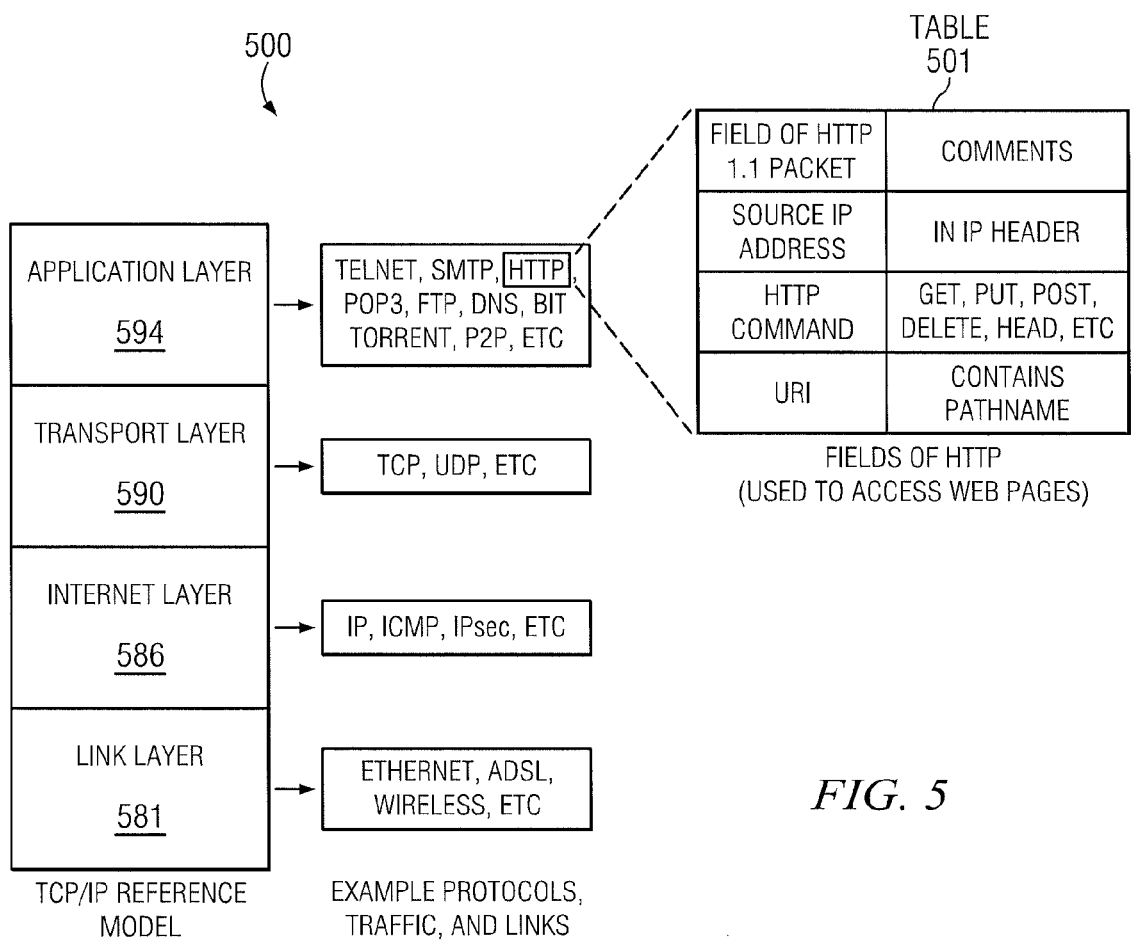
FIG. 5 is a diagram of an embodiment of the present invention that illustrates a TCP/IP reference model and application specific field information.

FIG. 5 is a diagram 500 of an embodiment of the present invention that illustrates components of a TCP/IP reference model 580. Deep packet inspection (DPI), details of which are described in Applicant's pending U.S. patent application (Serial Number not yet assigned) being filed concurrently herewith, entitled "Method and Apparatus for Network Address Translation" by Charles E. Perkins, which claims priority to Applicant's U.S. Continuation-in-Part application Ser. No. 12/877,984, filed on Sep. 8, 2010 and Applicant's U.S. Continuation-in-Part application Ser. No. 12/878,005, filed Sep. 8, 2010. The entire teachings of all patents, published applications, and references cited herein are incorporated by reference in their entirety, can inspect all layers of a traffic packet, including the payload of the packet which can exist at layers after the transport layer 590, such as the application layer 594 as described below.

The TCP/IP reference model 580 is one type of model to view or divide a communications network into smaller categories, such as layers. Each layer of the TCP/IP reference model 580 can communicate with the layer directly above or directly below itself.

The bottom layer, the link layer 581, is logically closer to the physical transmission of data among elements or sub elements in a network, such as Media Access Control (e.g., Ethernet or DSL). The Internet layer 586 can, for example, allow for the routing and controlling of traffic between hosts, such as a source and destination pair. The transport layer 590 enables end-user traffic transfer; typical examples include transmission control protocol (TCP) or user datagram protocol (UDP). The top layer, the application layer 594, is logically closest to the user application and can interact with a software application (e.g., Telnet, Simple Mail Transfer Protocol (SMTP), Hypertext Transfer Protocol (HTTP), Post Office Protocol 3 (POP3), File Transfer Protocol (FTP), Domain Name System (DNS), BitTorrent client (BitTorrent), Peer-to-Peer (P2P) etc.) that an end-user employs via a user interface or other tools of the software application. A person of ordinary skill in the art would understand that each network layer described above includes a multitude of additional functions and capabilities, and the descriptions above are provided as a brief overview and not the totality of the TCP/IP reference model for purposes of providing context for the example embodiment illustrated in FIG. 5.

In an example embodiment of the present invention, a table 501 illustrates example fields of a typical application packet, specifically a Hypertext Transfer Protocol (HTTP) packet, which is used to fetch web pages on network nodes. Each fetch or access to a web page by the HTTP packet must contain a specific pathname that is valid on the remote computer that identifies the desired web page. In example embodiments that employ DPI to inspect the application traffic payload, such as the HTTP packet illustrated in table 501, the inspected payload can improve salability and robustness of the using known payload fields for certain applications and protocols. For example, the payload fields can provide or identify the destination for the traffic.

In alternative example embodiments of the present invention, other reference models, such as an OSI reference model, may be used to understand or program deep packet inspection modules. Alternative embodiments may also maintain deep packet inspection modules at any location or network element in a communications network, such as the network 100b in FIG. 1B or operably interconnected remote internetworks.

Figure 6:
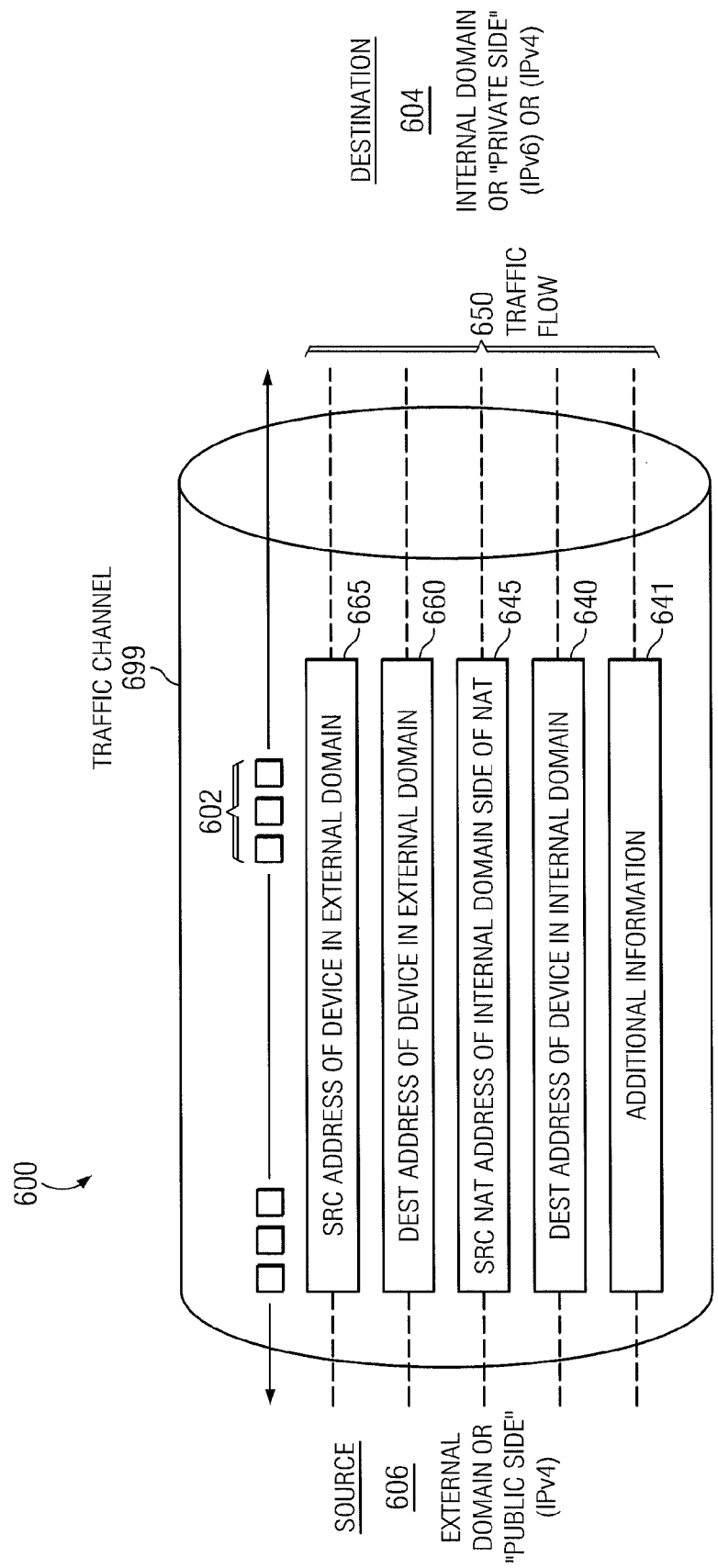
FIG. 6 is a diagram of an example embodiment of the present invention that illustrates traffic in a channel.

FIG. 6 is a diagram of an example embodiment of the present invention including a traffic channel 699 supporting various communications protocols, simultaneously, individually, time division multiplexed, or combinations thereof. In example embodiments of the present invention, performing DPI on all packets in a traffic channel or traversing the NAT device can determine a specific Application-level Gateway (ALG) or router to use for flow management. By employing DPI in this manner, the ALG can support network address/port translation for application layer protocols that may otherwise fail to traverse the NAT device. For example, the traffic channel 699 can support traffic, including P2P traffic, voice over Internet Protocol (VoIP) traffic, FTP traffic, BitTorrent traffic, or other protocol and application traffic currently known or hereinafter developed. The traffic channel 699 can be supported by any embodiments of the invention disclosed herein, such as those example embodiments that employ deep packet inspection and related activities.

The traffic channel 699 can provide support for the communications via a traffic flow 650, where the traffic flow 650 is from a source 606 to a destination 604 in an internetwork. The source 606 can be any of an external domain of an internetwork, client side of an internetwork, public network, or hereinafter developed network. The destination 604 can be any of an internal network, private network, or hereinafter developed network. In alternative example embodiments of the present invention, the traffic flow 650 can contain additional information 641 about a traffic packet, or the traffic packet 602 itself.

Continuing to refer to the example embodiment of FIG. 6, the traffic flow 650 is a communication between the source 606 and the destination 604 on the internetwork or plurality of interconnected networks. Every packet in the flow, and in general, will have a source address and a destination address. Each traffic flow 650 will have at least four parameters: (1) a source address for a packet arriving at the NAT device from the external domain will have the address of the device in the external domain 665, (2) a destination address for a packet arriving at the NAT device from the external domain will have the NAT address on the external side 660, (3) a source address of a packet transmitted from the NAT device to the IPv6 device will have the NAT address on the internal side 645, and (4) a destination address of a packet transmitted from the NAT device to the IPv6 device will have the destination address of the device in the internal domain 640 from the internal domain.

In example embodiments of the present invention, the flow 650 is established only once all four address parameters are known, and only one address (i.e., the source address for a packet arriving at the NAT device from the external domain will have the address of the device in the external domain 665) is missing when the flow record is pending; in other words, if less than four addresses are known, the flow is considered to be in a pending state. For instance, when the DNS server, such as the DNS server 161b of FIG. 1B, allocates the external NAT address 660 on the NAT device, that flow remains in a pending state because only three of the four addresses are known. When a traffic packet arrives at the external domain side of the NAT device for a pending flow, that packet can be used to establish or complete the pending flow if that packet does not match any of the existing flows at the external domain NAT address. In other words, the external domain source address of that traffic packet can be used to complete the required quadruplet of addresses, thereby establishing the flow.

In alternative example embodiments of the present invention, the traffic flow 650 can contain additional information 641 or other information as is currently known or future developed relevant to the flow of traffic. When all four addresses (i.e., addresses 665, 660, 645, and 640) are known, the traffic flow 650 is established. Only an established traffic flow 650 can be forwarded to the identified destination.

Further alternative example embodiments may allow for traffic flow to originate at the internal domain of a private network and flow towards an external domain of a public network. In such alternative example embodiments, for a traffic packet emanating from the internal IPv6 device, the source and destination addresses are correspondingly reversed for such outgoing packets. In addition, example embodiments can allow for bidirectional traffic flow between an external domain and an internal domain, where the communications can be initiated by either the external domain or the internal domain.

In alternative example embodiments of the present invention, a network with two different destinations can use the NAT device to communicate with two different destinations in the privately addressed (internal domain) network. In the example embodiments of FIG. 1B and FIG. 3, the SIPNAT request to a domain name system (DNS) server enables the network address translation that is dependent on the source IP address, and permits establishing two identifiable flows, one per destination. In some example embodiments of the present invention, the use of flow management allows traffic to be transmitted at line rates; and, by employing DPI and SIPNAT, traffic packet delivery can be guaranteed at 100 percent accuracy.

In a further alternative embodiment, a single source can attempt to initiate communication with two different destinations in the privately-addressed network. In such an example embodiment, a SIPNAT can rely on a DNS-based setup phase for setting up the flow translation for a new incoming flow. This is due to the fact that the flow setup does not have available the IP address of the actual source—only the IP address of the requesting DNS resolver. This case would be resolved perfectly if the payloads contain information of any type that can identify the proper destination. In the situation described above for an embodiment this invention, useful aspects lie in isolating and tabulating statistics for appropriate fields of the application protocol messages (e.g., HTTP). Since this is the case that represents the major failure mode for SIPNAT, it is useful to that technology (and likely for any other such technology involving IPv4 to IPv6 translation for incoming packets). Similar gains accrue for any other procedure for setting-up flow translations for incoming communication, depending on the details of how the flow translation is initially established. The selection of fields upon which statistics are tabulated is dependent on the application, but any application making use of uniform resource locator (URLs) or uniform resource identifier (URIs) is very likely to enable great improvements in translation accuracy available to the underlying IPv4 to IPv6 translation for incoming packets.

In alternative example embodiments of the present invention, the disambiguator module can use at least a subset of the records or resource identifiers determined to be associated with the records to characterize the traffic packets. The disambiguator module can further identify candidate tags within certain fields of the traffic packet headers or payload that are relevant to a destination and categorize the candidate tags with respect to association of the traffic packets in a flow.

In additional example embodiments of the present invention, the recordation module can record resource identifiers along with an indication about a degree of certainty of the actual destination associated with the traffic packets in a flow. The resource identifiers can be collected by parsing algorithms or state machines to monitor the progress of a negotiation between two peer nodes for establishment of a corresponding resource transmission.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While the present invention has been particularly shown and described with references to example embodiments thereof, it will be understood by those skilled in the art that various changes in form and details may be made therein without departing from the scope of the invention encompassed by the appended claims.

What is claimed is:

1. A method for performing network address translation, the method comprising:
   storing history of characteristics of inbound traffic packets transmitted to a particular destination;
   employing pattern matching to compare characteristics of subsequent inbound traffic packets to the history; and
   disambiguating the characteristics of the subsequent inbound traffic packets to determine the particular destination associated with the subsequent inbound traffic packets based on the pattern matching, the disambiguating including using, in combination, the history and at least one record based on a least one field within an incoming payload of the inbound or subsequent inbound traffic packets.

2. The method according to claim 1 further comprising:
   maintaining records including the at least one record about certain fields of the inbound or subsequent inbound traffic packets with incoming payloads having characteristics of a flow in which flow translation in a network address translation (NAT) device has been initialized; and
   using the history and records in combination to disambiguate the subsequent inbound traffic packets in the NAT device.

3. The method according to claim 2, further comprising:
   identifying candidate tags within the certain fields that are relevant to the particular destination, wherein the disambiguating includes comparing a combination of traffic packet header information and the candidate tags to the records.

4. The method according to claim 1 further including collecting resource identifiers by parsing traffic flow management methods or state machines to monitor progress of a negotiation between two peers for establishment of a corresponding resource identifier transmission.

5. The method according to claim 1 further including, for flows that have timed out, inspecting the payload of traffic packets for information that can be uniquely associated with one specific destination for the payload.

6. The method according to claim 1, further including:
   isolating and tabulating statistics for certain fields of application protocol messages; and
   using at least one statistic to disambiguate traffic packets with a resource identifier more or most likely to be determined to be associated with the records.

7. The method according to claim 1 further including using deep packet inspection to obtain data from certain fields, to obtain a resource identifier, or both.

8. The method according to claim 1 wherein a public address of the NAT device is within a legacy protocol and a private address of the NAT device is within an updated version of the legacy protocol.

9. The method according to claim 8, wherein the public address is an IPv4 address and the private address is an IPv6 address.

10. The method according to claim 1, wherein a public address of the NAT device is an IPv4 address and a private address of the NAT device is within an IPv4 address.

11. The method according to claim 1 wherein, for resource handling both known to the NAT device and making a resource identifier available, storing the resource identifier as being associated with a destination hosting a corresponding application.

12. The method according to claim 1 further including recording resource identifiers along with an indication about a degree of certainty of correspondence with respective destinations.

13. The method according to claim 1 applied to a Bit Torrent protocol or similarly functioning protocol.

14. The method according to claim 1 wherein the characteristics of the inbound traffic packets and subsequent inbound traffic packets includes contents of a traffic packet header and payload, certain fields associated with the inbound traffic packets, access patterns, and contextual information.

15. The method according to claim 14 wherein the contextual information includes time of day and geographical location associated with the inbound traffic packets.

16. The method according to claim 1 applied to peer-to-peer communication.

17. The method according to claim 1 wherein the pattern matching is employed to compare the characteristics of the subsequent inbound traffic packets based on storing information relating to at least one traffic packet.

18. The method according to claim 1 wherein for inbound traffic packets unambiguously targeted to the particular destination, the storing of the history of characteristics including delimiting fields of payloads of the inbound traffic packets, inspecting and characterizing the fields delimited, for the pattern matching employed.

19. A network device for performing network address translation, the network device comprising:
a storage module configured to store history of access patterns to destinations;
a comparison module configured to employ pattern matching to compare characteristics of subsequent inbound traffic packets to the history; and
a disambiguator module configured to use, in combination, the history and at least one record based on at least one field within an incoming payload to the subsequent inbound traffic packets to disambiguate a traffic packet in a network address translation (NAT) device.

20. The network device of claim 19 further comprising:
a maintenance module configured to maintain records including the at least one record about certain fields of the subsequent inbound traffic packets with incoming payloads associated with a flow in which translation in the NAT device has been initialized; and
wherein the disambiguator module is further configured to use the history and records in combination to disambiguate the subsequent inbound traffic packets in the NAT device.

21. The network device of claim 19 further comprising an identification module operably interconnected to the disambiguator module and configured to identify candidate tags within certain fields of the traffic packet that are relevant to a destination.

22. The network device of claim 21 wherein the disambiguator module is further configured to compare a combination of traffic packet header information and the identified candidate tags to the maintained records.

23. The network device of claim 19 further comprising a collection module configured to collect resource identifiers by parsing traffic flow management methods or state machines, the collection module being operably interconnected to a monitor configured to monitor progress of a negotiation between two peer applications for establishment of a corresponding resource identifier transmission.

24. The network device of claim 19 wherein the disambiguator module is further includes:
a statistics module configured to isolate and tabulate statistics for certain fields of application protocol messages; and
wherein the disambiguator module is further configured to use at least one statistic to disambiguate the traffic packet with a resource identifier more or most likely to be determined to be associated with the records.

25. The network device of claim 19 further comprising a deep packet inspection (DPI) module to obtain data from certain fields, obtain a resource identifier, or both.

26. The network device of claim 19 wherein a public address of the NAT device is within a legacy protocol and a private address of the NAT device is within an updated version of the legacy protocol.

27. The network device of claim 26 wherein the public address is an Internet Protocol version 4 (IPv4) address and the private address is an Internet Protocol version 6 (IPv6) address.

28. The network device of claim 27 wherein the public address of the NAT device is the IPv4 address and the private address of the NAT device is within the IPv4 address.

29. The network device of claim 19 wherein the storage module is further configured, for resource handling both known to the NAT device and making a resource identifier available, to store the resource identifier as being associated with a destination hosting a corresponding application.

30. The network device of claim 19 further comprising a recordation module to record resource identifiers along with an indication about a degree of certainty of correspondence with respective destinations.

31. A computer program product including a non-transitory computer readable medium having computer readable instructions to perform network address translation, wherein the computer readable instructions, when executed by a processor, cause the processor to:
store history of characteristics of inbound traffic packets associated with a particular destination;
employ pattern matching to compare characteristics of subsequent inbound traffic packets to the history; and
disambiguate the characteristics of the subsequent inbound traffic packets to determine the particular destination associated with the subsequent inbound traffic packets using, in combination, the history and at least one record based on at least one field within an incoming payload of the inbound or subsequent inbound traffic packets.

32. A method for performing network address translation, the method comprising:
storing history of characteristics of inbound traffic packets transmitted to a particular destination;
employing pattern matching to compare characteristics of subsequent inbound traffic packets to the history;
disambiguating the characteristics of the subsequent inbound traffic packets to determine the particular destination associated with the subsequent inbound traffic packets based on the pattern matching; and
collecting resource identifiers by parsing traffic flow management methods or state machines to monitor progress of a negotiation between two peers for establishment of a corresponding resource identifier transmission.

33. A method for performing network address translation, the method comprising:
storing history of characteristics of inbound traffic packets transmitted to a particular destination;
employing pattern matching to compare characteristics of subsequent inbound traffic packets to the history;
disambiguating the characteristics of the subsequent inbound traffic packets to determine the particular destination associated with the subsequent inbound traffic packets based on the pattern matching; and for flows that have timed out, inspecting payload of traffic packets for information that can be uniquely associated with one specific destination for the payload.

34. A method for performing network address translation, the method comprising:

storing history of characteristics of inbound traffic packets transmitted to a particular destination;

employing pattern matching to compare characteristics of subsequent inbound traffic packets to the history;

disambiguating the characteristics of the subsequent inbound traffic packets to determine the particular destination associated with the subsequent inbound traffic packets based on the pattern matching;

isolating and tabulating statistics for certain fields of application protocol messages; and using at least one statistic to disambiguate traffic packets with a resource identifier more or most likely to be determined to be associated with the records.

35. A method for performing network address translation, the method comprising:

storing history of characteristics of inbound traffic packets transmitted to a particular destination;

employing pattern matching to compare characteristics of subsequent inbound traffic packets to the history;

disambiguating the characteristics of the subsequent inbound traffic packets to determine the particular destination associated with the subsequent inbound traffic packets based on the pattern matching; and using deep packet inspection to obtain data from certain fields, to obtain a resource identifier, or both.

* * * * *